(12) United States Patent
Ohgane

(10) Patent No.: US 6,511,190 B2
(45) Date of Patent: Jan. 28, 2003

(54) REFLECTION TYPE OPTICAL DEVICE AND METHOD OF MANUFACTURING THE SAME

(75) Inventor: Masanobu Ohgane, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,120

(22) Filed: Jun. 25, 2001

(65) Prior Publication Data

US 2002/0036829 A1 Mar. 28, 2002

(30) Foreign Application Priority Data

Jun. 28, 2000 (JP) ........................................ 2000-193714
Jun. 5, 2001 (JP) ........................................ 2001-169039

(51) Int. Cl.[7] ............................ G02B 5/08; G02B 7/182
(52) U.S. Cl. ........................ 359/856; 359/857; 359/858; 359/834
(58) Field of Search ........................ 359/834, 856–859; 385/36

(56) References Cited

U.S. PATENT DOCUMENTS 5,589,733 A * 12/1996 Noda et al. ................. 313/509
5,995,287 A 11/1999 Sekita ......................... 359/599
6,067,128 A * 5/2000 Imai ............................... 349/8
6,180,033 B1 * 1/2001 Greshes ..................... 264/1.32

FOREIGN PATENT DOCUMENTS

JP 9-90229 4/1997
JP 10-139474 5/1998

OTHER PUBLICATIONS

A. Vaškelis et al., "Structure of Electroless Silver Coatings Obtained Using Cobalt (II) As a Reducing Agent," 82 *Surface and Coatings Technology* 165–168 (1996).

* cited by examiner

Primary Examiner—Cassandra Spyrou
Assistant Examiner—Alessandro V. Amari
(74) Attorney, Agent, or Firm—Fitzpatrick, Cella, Harper & Scinto

(57) ABSTRACT

A reflection type optical device comprises a transparent base member having an incident light receiving surface, at least a reflection surface for internally reflecting the incident light and a light emitting surface for emitting the reflected light. A dielectric layer is formed on each of the incident light receiving surface and the light emitting surface, and a metal layer is formed on all the remaining surfaces of the transparent base member other than the incident light receiving surface and the light emitting surface.

20 Claims, 6 Drawing Sheets

REFLECTION TYPE OPTICAL DEVICE AND METHOD OF MANUFACTURING THE SAME

BACKGROUND OF THE INVENTION

1. Field of the Invention

This invention relates to a reflection type optical device that is highly durable particularly in terms of moisture resistance and water resistance. The present invention is particularly suited for reflection type optical device using a transparent glass member formed by molding press.

2. Related Background Art

Reflection type optical devices prepared by coating the front or rear surface of a base member with high reflection film in order to obtain a desired image by utilizing the reflection of that surface are known. Metal film such as aluminum film or silver film showing a high reflectance is used for such high reflection film. Particularly, silver film is popularly being used for mirrors and reflection type optical devices because it shows a very high reflectance in the wavelength range of visible light between 350 nm and 700 nm.

Techniques such as vacuum evaporation, sputtering and ion plating are popular for forming metal films such as aluminum films and silver films. A wet film forming process typically involving a silver mirror reaction may be used for forming silver film. A metal film may be used by itself as high reflection film or in combination with an anti-oxidation film for preventing oxidation of the metal film and/or a reflection boosting film for improving the reflection characteristics of the metal film to produce a multilayer film structure.

Meanwhile, as a result of the current trend of down-sizing and achieving a higher performance of imaging devices, efforts for down-sizing and achieving a higher performance of reflection type optical devices to be used for such imaging devices are also demanded. As an attempt for meeting the demand, Japanese Patent Application Laid-Open No. 9-90229 proposes a method of forming an internal reflection type optical device by forming an a reflection film on a transparent base member having an aspherical optical surface. The number of lenses of an imaging device can be reduced by using the proposed method.

On the other hand, the transparent base member is required to be made to show a complex profile typically including a number of minute and irregular surfaces. Then, transparent resin or glass adapted to molding press is used as material for forming the base member of the reflection type optical device in order to accommodate the complex profile. Transparent glass is often used particularly when the light path of light passing through the inside of the internal reflection type optical device is long. Thus, glass materials adapted to molding press and having a low softening point, as well as improved optical properties, have been developed to accommodate the complex profile of the base member.

There have been developed glass materials having a low softening point and containing one or more than one of oxides including $SiO_2$, $B_2O_3$, $Al_2O_3$, $P_2O_5$, $Y_2O_3$, $La_2O_3$, $Gd_2O_3$, $TiO_2$, $Nb_2O_5$, $ZnO$, $MgO$, $CaO$, $SrO$, $BaO$, $Li_2O$, $Na_2O$, $K_2O$, $Sb_2O_3$, $MgF_2$, $SnO_2$, $ZrO_2$, $As_2O_3$ and $GeO_2$ and substitution products thereof using fluorine, nitrogen or some other element.

The transparent base member is formed by heating and softening a preform prepared by cutting and polishing a gob or a glass block and subsequently press molding the preform in a metal mold having high precision surfaces. This method is characterized in that it can realize low cost and mass production because it does not require any grinding and/or polishing steps after the molding.

For the purpose of achieving the major objective of low cost mass production of reflection type optical devices, it is necessary to meet the following requirements. Firstly, the objective of low cost mass production cannot be achieved if the metal mold cannot be used repeatedly for molding press. Therefore, the temperature of molding press needs to be held as low as possible in order to avoid oxidation of the surfaces of the metal mold. While the upper limit of the temperature of molding press is between 650 and 700° C. and accordingly the upper limit of glass transition temperature is between 550 and 600° C. at present, it is desired to lower these upper limit values from the viewpoint of suppressing oxidation of the surfaces of the metal mold and prolonging its service life.

However, transparent base members obtained by the prior art are not satisfactory in terms of environment resistance and durability. For one thing, the chemical resistance of glass materials showing a low glass transition temperature to be used for molding is generally not satisfactory. Particularly, base members made of glass of the phosphate type, the lanthanum type or the barium type that are to be used for molding become clouded on the surface to reduce the light transmittance thereof as the glass reacts with moisture when they are stored for a long time in an environment showing high temperature and a high relative humidity.

Meanwhile, techniques of forming a coating film on the surface of a transparent base member have been proposed to address the above problem and improve the performance of the base member. For instance, Japanese Patent Application Laid-Open No. 10-139474 describes an arrangement for improving both the anti-reflection performance and the durability of a transparent base member by forming a dielectric layer having a multilayer structure ($MgF_2$/$ZrO_2$/$MgF_2$/$ZrO_2$/$MgF_2$) on the surface of the transparent base member.

However, as a matter of course, the above arrangement of improving the environment resistance and the durability of a reflection type optical device by using a dielectric layer involves a step of forming a humidity-resistive dielectric film on the entire surface of the glass base member in addition to a step of forming a metal film on a plurality of reflection planes of the device so that the process of manufacturing such an optical device inevitably comprises a large number of steps. Additionally, the number of surfaces of an optical device on which film has to be formed has been increased remarkably as a result of meeting the requirement of realizing irregular or multiplanar surfaces to by turn increase the number of manufacturing steps. A large number of manufacturing steps entails high film forming cost.

SUMMARY OF THE INVENTION

In view of the above identified circumstances, it is therefore an object of the present invention to provide a reflection type optical device that performs well in terms of environment resistance and durability and can be manufactured at low cost by dissolving the problems of the prior art.

Another object of the present invention is to provide a method of manufacturing a reflection type optical device that performs well in terms of environment resistance and durability.

According to the invention, the above objects are achieved by providing a reflection type optical device comprising:

a transparent base member having an incident light receiving surface, at least a reflection surface for internally reflecting the incident light and a light emitting surface for emitting the reflected light;

a first dielectric layer formed on the incident light receiving surface and the light emitting surface of the transparent base member; and a metal layer formed on all the remaining surfaces of the transparent base member other than the incident light receiving surface and the light emitting surface.

In another aspect of the invention, there is also provided a method of manufacturing a reflection type optical device comprising steps of:

preparing a transparent base member having an incident light receiving surface, at least a reflection surface for internally reflecting the incident light and a light emitting surface for emitting the reflected light;

forming a first dielectric layer on the incident light receiving surface and the light emitting surface of the transparent base member; and forming a metal layer on all the remaining surfaces of the transparent base member other than the incident light receiving surface and the light emitting surface.

DESCRIPTION OF THE PREFERRED EMBODIMENTS

Now, the present invention will be described in greater detail by referring to the accompanying drawings that illustrate preferred embodiments of the invention.

Figure 1A:
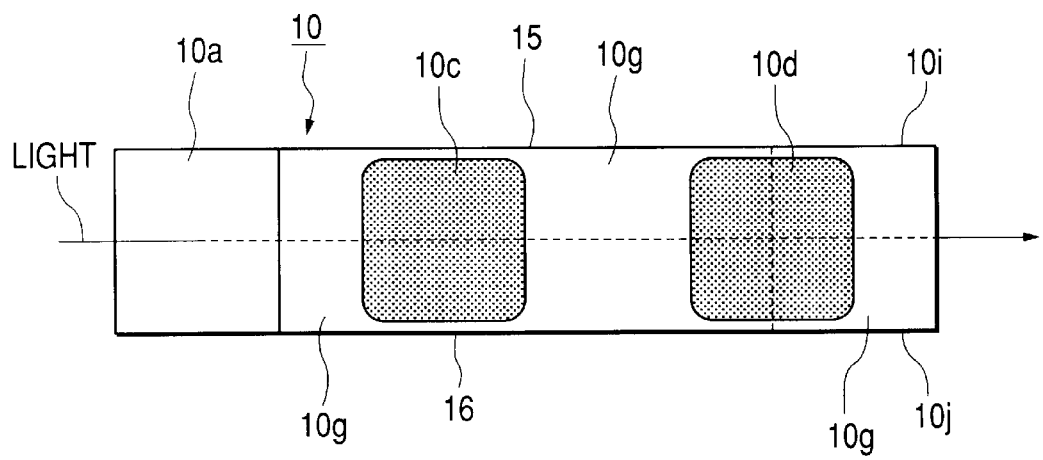
FIGS. 1A, 1B and 1C are schematic illustrations of a transparent base member to be used for the first embodiment of reflection type optical device according to the invention.
Figure 1B:
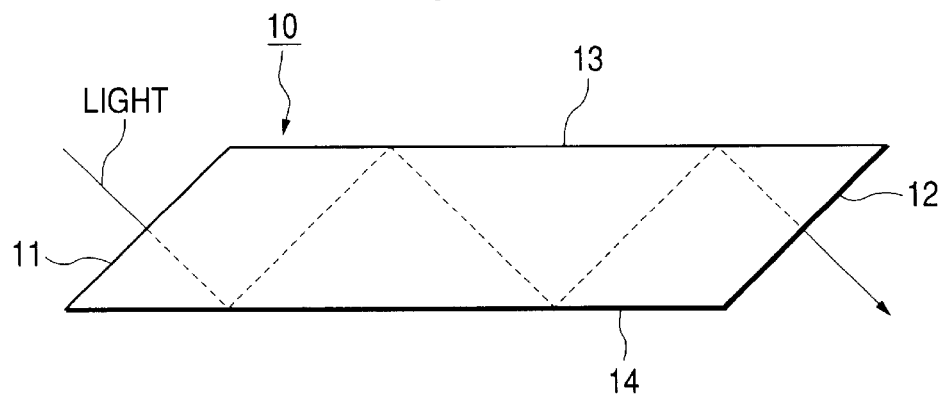
Figure 1C:
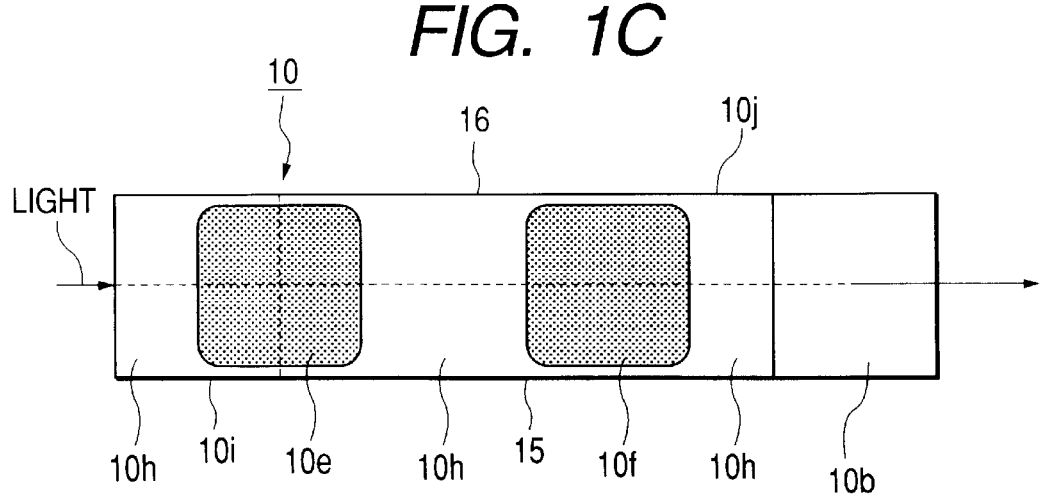

FIGS. 1A through 1C are schematic illustrations of a transparent base member to be used for the first embodiment of reflection type optical device according to the invention. FIG. 1A shows a plan view and FIG. 1B shows a lateral view, whereas FIG. 1C shows a bottom view. The transparent base member 10 is an oblong member that has an inclined and upwardly disposed end facet 11 comprising an incident light receiving surface 10a, an inclined and downwardly disposed end facet 12 comprising a light emitting surface 10b, a top surface 13 having a pair of optical reflection-effective sections 10c, 10d adapted to reflect light by the rear surfaces thereof and a bottom surface 14 having a pair of optical reflection-effective sections 10e, 10f adapted to reflect light by the rear surfaces thereof.

The top surface 13 of the transparent base member 10 has a non-effective section 10g mainly disposed between the optical reflection-effective sections 10a, 10b and near the opposite end facets while the bottom surface 14 has a non-effective section 10h disposed between the optical reflection-effective sections 10e, 10f and near the opposite end facts. The lateral surfaces 15, 16 of the transparent base member are also non-effective sections 10i, 10j.

Figure 2A:
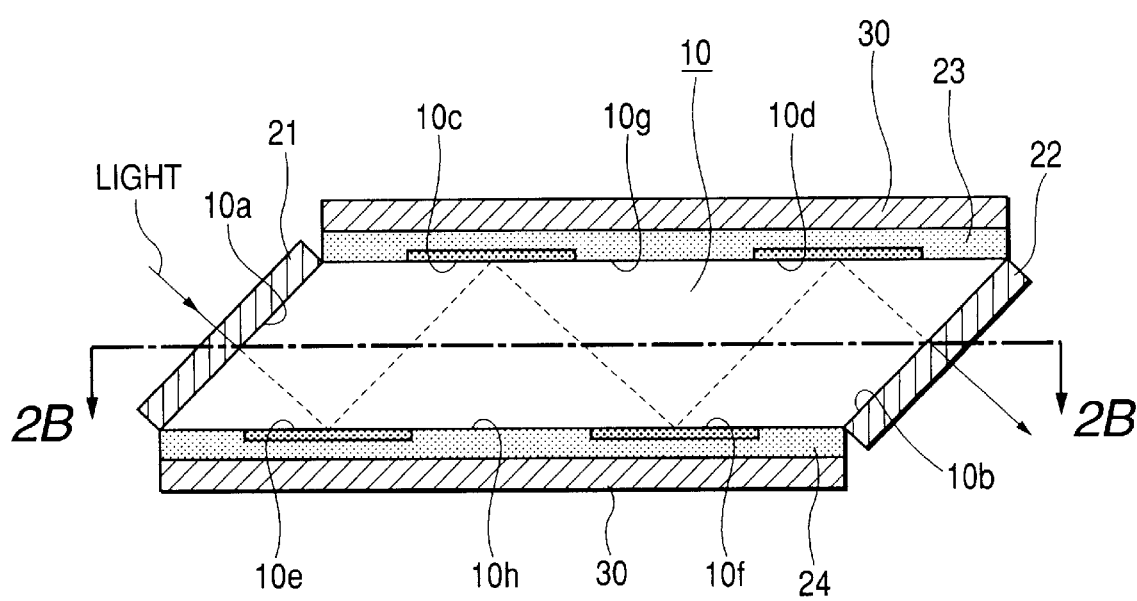
FIGS. 2A and 2B are schematic illustrations of the first embodiment of reflection type optical device according to the invention.
Figure 2B:
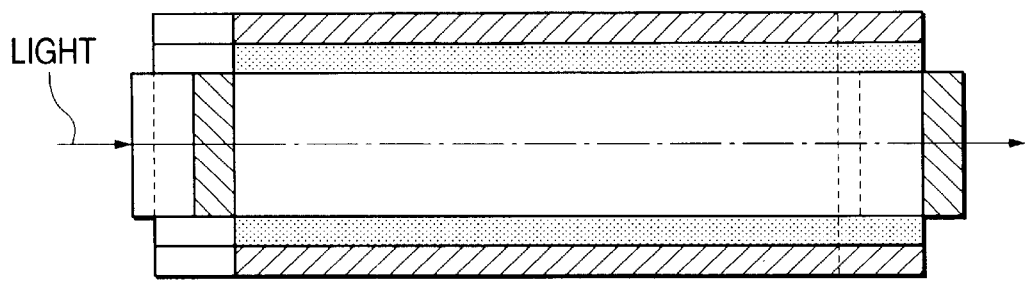

FIGS. 2A and 2B are schematic illustrations of the first embodiment of reflection type optical device according to the invention and comprising a transparent base member 10 having the above described configuration. FIG. 2A shows a vertical cross sectional view and FIG. 2B shows a horizontal cross sectional view. The transparent base member 10 is made of glass for molding press and hence accompanied by the durability problem of becoming clouded in an environment showing high temperature and a high relative humidity to reduce the reflectance and the transmittance. In view of this problem, the base member 10 of this embodiment is provided on the end facets 11, 12 comprising respectively the incident light receiving surface 10a and the light emitting surface 10g with respective moisture-resistant dielectric layers 21, 22. Additionally, the remaining surfaces other than the end facts 11, 12 of the transparent base member 10, or the top surface 13, the bottom surface 14, the opposite lateral surfaces 15, 16, are covered by respective metal films 23, 24, 25, 26 that are silver films. The metal films 23, 24, 25, 26 are adapted to reflect light by the rear surfaces thereof in the optical reflection-effective sections 10c through 10f and operate as anti-moisture films for fending off moisture trying to enter through the outer surfaces 13 through 16 of the transparent base member 10 respectively comprising the optical reflection-effective sections 10c through 10f and the non-effective sections 10g through 10j. This embodiment additionally comprises an acrylic resin layer 30 formed on the metal films 23 through 26 for the anti-rust purpose.

As the entire surfaces 11 through 16 of the transparent base member 10 are covered by the moisture-resistant dielectric layers 21, 22 and the metal films 23 through 26, the low environment resistance of the transparent base member is satisfactorily made up for to realize a high performance reflection type optical device that is highly environment-resistant.

The metal films and the dielectric layers can fend off moisture trying to enter and penetrate into the transparent base member. As a result, it is now possible to realize a reflection type optical device that operates excellently without giving rise to any burn of the glass.

The metal films are preferably silver films as in the first embodiment and the silver films are preferably formed by means of a wet film forming process.

Preferably, the wet film forming process to be used for forming silver films employs an electroless plating method of reducing and depositing silver ions in the plating bath by means of the catalyctic metal on the surface of the transparent base member to produce silver films.

Preferably, the reflectance of a surface and the film thickness of each of the silver films formed by electroless plating is found within the respective ranges listed below.
reflectance: 80–99.5% (wavelength: 350–900 nm)
film thickness: 100–1,000 nm Preferably, a dielectric layer having a multilayer structure realized by alternately laying a low refractive index film and a high refractive index film is formed on each of the silver films as reflection boosting layer arranged between the transparent base member and the silver film. For example, a high refractive index film made of $TiO_2$, $ZnO_2$ or $Al_2O_3$ and a low refractive index film made of $SiO_2$ may be alternatively formed to produce a multilayer structure.

Preferably, the moisture-resistant dielectric layer on the incident light receiving surface and the light emitting surface is a multilayer film operating as anti-reflection film. Still preferably, the multilayer film has a structural configuration of $Al_2O_3/Ta_2O_5/Al_2O_3/Ta_2O_5/Al_2O_3/Ta_2O_5/MgF_2$ as viewed from the side of the glass base member. A multilayer having such a structural configuration is lowly transmissive relative to moisture and shows a reflectance as low as 0.3% so that it is optically stable.

Techniques that can be used for the wet film forming process of forming silver films for the purpose of the invention include a silver mirror reaction, electroplating and electroless plating, of which electroless plating is particularly preferable for the reasons listed below.

(1) It is not necessary to prepare in advance an electrically conductive film operating as contact point on the transparent base member and the base member shows a high reflectance after forming the silver films.
(2) It is possible to selectively realize a silver depositing reaction on the transparent base member to obtain a uniform silver film showing a uniform film thickness so that the reflectance of the entire optical device does not fluctuate.
(3) The rate of the silver depositing reaction can be regulated by controlling the composition of a plating bath. Then, it is possible to minimize the waste of the plating bath.
(4) It is possible to select a plating bath composition to suppress any appearance of fulminating silver.

Generally, with electroless plating, firstly catalytic metal or ions of catalytic metal are applied onto the base member in order to promote the metal depositing reaction in the plating bath. Subsequently, as the base member that is now carrying the catalyst is immersed in the plating bath, a metal depositing reaction takes place on the substrate to plate the latter.

Any catalytic metal or ions of catalytic metal can be used to promote the metal depositing reaction on the base member in the plating bath so long as the metal or ions of the metal can promote the silver depositing reaction in the silver electroless plating bath. Metals that can be used as catalytic metal include gold, silver, copper, palladium, cobalt, tin and nickel. Therefore, ions of any of the listed metals and colloid containing any of the metals or ions of any of the metals can also be used for the electroless plating.

The surface of the transparent base member may be pretreated in order to uniformly apply the catalytic metal or ions of the catalytic metal. Techniques that can be used for pretreating the surface of the transparent base member include those adapted to reduce the surface energy of the base member such as acid/alkali etching, $UV-O_3$ treatment (ultraviolet ozone treatment), corona discharge treatment and excimer irradiation treatment and those for making the surface of the base member hydrophilic by using a substance having a polar group such as a surfactant. Any of the above techniques may be used alone or in combination. As a result of such a treatment, the catalytic metal or ions of the catalytic metal can be applied uniformly onto the transparent base member.

Ions of the catalytic metal are adsorbed onto the base member with a weak adsorption force and can fall in the plating bath to accelerate the decomposition of the solution in the plating bath. If such a phenomenon appears, it is preferable to reduce ions of the catalytic metal so that the catalytic metal may be rigidly held onto the base member. Any appropriate reducing agent may be used to reduce ions of the catalytic metal.

Thus, the electroless plating bath contains soluble ions of silver, a reducing agent for reducing silver ions and depositing silver on the transparent base member, a chelating agent for forming a chelate with silver ions and stabilizing the plating bath and a pH regulating agent for preventing any decrease in the force driving the plating reaction that can occur when the amount of hydrogen ions increases as a result of the oxidizing reaction of the reducing agent.

While any reducing agent that can reduce silver ions dissolved in the plating bath may be used for the purpose of the invention, examples of popular reducing agent include formaldehyde, Rochelle salt, hydrazine and hydrazine borane. Additionally, as described in Surface and Coatings Technology 82 (1996), 165–168, cobalt sulfate can also be used as reducing agent.

Any chelating agents forming a chelate with silver ions dissolved in the plating bath to suppress the silver depositing reaction in the plating bath and easily deposit silver on the base member by means of the catalyst applied onto the base member, including for example cyan, can nonlimitatively be used for the purpose of the invention. However, cyan is a highly toxic substance and requires every precautionary measure when it is used on the basis of industrial dimensions. This problem can be avoided by using ammonia or an ammonia derivative as chelating agent in a manner as described in Surface and Coatings Technology 82 (1996), 165–168.

The silver film formed by electroless plating preferably shows a reflectance of 80% ($\lambda$=400 nm) or higher and has a film thickness of not less than 50 nm in order to secure such a high reflectance. However, a silver film with a film thickness of about 50 nm can permeate moisture in a high temperature/high humidity environment and therefore the silver film preferably has a film thickness of not less than 100 nm.

On the other hand, the silver film preferably has a film thickness not greater than 1,000 nm in order to suppress any cracks that can be produced by the stress generated (particularly at a site of the base member having a large curvature) when depositing silver in the process of forming a silver film.

The transparent base member is preferably made of glass to be used for molding press. More preferably, it is made of phosphate type glass. Such a material is preferably used because it is highly moldable and hence it can be used to realize a high performance reflection type optical device having a complex profile including a number of minute or irregular surfaces. Particularly, the use of phosphate type glass is advantageous because it can be molded to show a very complex profile because of its low glass transition temperature.

EXAMPLE 1

In this example, a film having a structural configuration as shown in FIGS. 2A and 2B was prepared. More specifically, dielectric layers 21, 22 were formed by means of an ion beam assisted evaporation technique respectively on the incident light receiving surface 10a and the light emitting surface 10b of a transparent base member 10 made of glass (LPHL-1: tradename, available from Ohara Inc.) and formed by cutting and polishing. The dielectric layers 21, 22 had a multilayer structure prepared by sequentially forming films of $Al_2O_3$:31.2 nm/$Ta_2O_5$:8.8 nm/$Al_2O_3$:37.8 nm/$Ta_2O_5$:64.2 nm/$Al_2O_3$:10.5 nm/$Ta_2O_5$:39.4 nm/$MgF_2$:93.6 nm as viewed from the side of the glass base member. Then, silver films (metal films) 23 through 26 were formed by vacuum evaporation respectively on the outer surfaces 13 through 16 of the transparent base member 10 including the optical reflection-effective sections 10c, 10d, 10e, 10f and the non-effective sections 10g, 10h, 10i, 10j. At this time, the vacuum evaporation process was so controlled as to make the silver films show a film thickness of 200 nm.

As a result, a silver film was formed on all the surfaces of the transparent base member except the surfaces where a moisture-resistant dielectric layer was formed.

Then, an acrylic resin layer 30 was formed on the silver films by applying acrylic resin (ALMATEX: tradename, dilute solution: available from Mitsui Chemicals, Inc.) by means of a dipping coat technique for the anti-rust purpose, with masking the incident light receiving surface 10a and the light emitting surface 10b of the transparent base member 10. Thereafter, the applied acrylic resin was dried and baked at 100° C. for 30 minutes. Subsequently, the masking was removed.

The reflection type optical device obtained in this example showed an initial transmittance of 82% for light with a wavelength of 500 nm. The produced silver films showed no film unevenness.

The optical device was left in an environment of 60° C. and 90% for 1,000 hours and subsequently the transmittance of the optical device was observed again to find that it was 82%, which was same as the initial value. Thus, the initial transmittance of 82% was maintained. No white burn was observed on the glass base member.

COMPARATIVE EXAMPLE 1

Figure 3A:
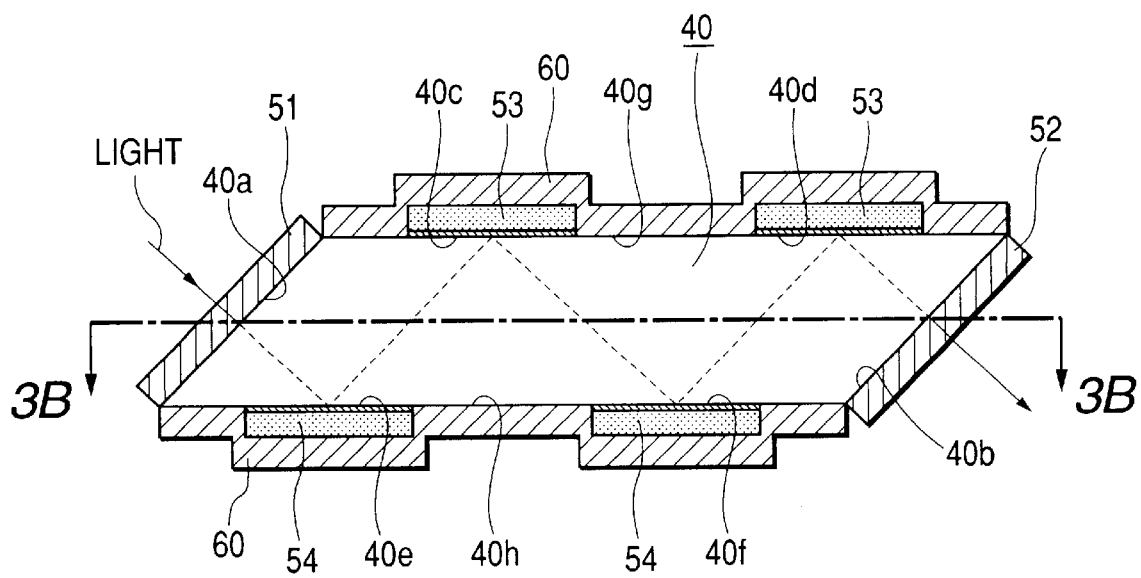
FIGS. 3A and 3B are schematic illustrations of the reflection type optical device prepared in comparative examples.
Figure 3B:
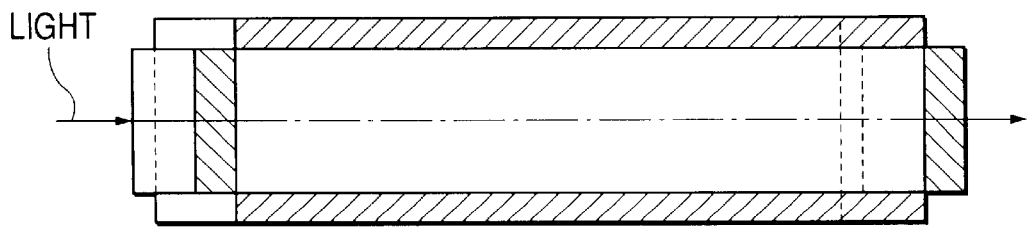

FIGS. 3A and 3B are schematic illustrations of the reflection type optical device prepared in comparative examples. FIG. 3A is a vertical cross sectional view and FIG. 3B is a horizontal cross sectional view. Referring to FIGS. 3A and 3B, dielectric layers 51, 52 were formed by means of an ion beam assisted evaporation technique respectively on the incident light receiving surface 40a and the light emitting surface 40b of a transparent base member 40 made of glass (LPHL-1: tradename, available from Ohara Inc.). The dielectric layers had a multilayer structure prepared by sequentially forming films of $Al_2O_3/Ta_2O_5/Al_2O_3/Ta_2O_5/Al_2O_3/Ta_2O_5/MgF_2$ as viewed from the side of the glass base member. Then, silver films (metal films) 53 and 54 were formed by vacuum evaporation respectively on the optical reflection-effective sections 40c, 40d, 40e, 40f. At this time, the vacuum evaporation process was so controlled as to make the silver films show a film thickness of 200 nm. Then, an acrylic resin layer 60 was formed on the silver films by applying acrylic resin (ALMATEX: tradename, dilute solution: available from Mitsui Chemicals, Inc.) by means of a dipping coat technique for the anti-rust purpose, with masking the incident light receiving surface 40a and the light emitting surface 40b of the transparent base member 40. Thereafter, the applied acrylic resin was dried and baked at 100° C. for 30 minutes. Subsequently, the masking was removed.

The reflection type optical device obtained in this example showed an initial transmittance of 82% for light with a wavelength of 500 nm. The produced silver films showed no film unevenness.

However, after leaving the optical device in an environment of 60° C. and 90% for 1,000 hours, the transmittance of the optical device was observed again to find that it had fallen to 73% from the initial value of 82%. Additionally, white burns were observed on the glass base member. The above fall of the transmittance (or reflectance) was caused as moisture penetrated into the transparent base member through the end facets carrying no silver film until white burns appeared there.

The data obtained by observing the specimens of Comparative Example 1 and Example 1 are summarized in Table 1 below.

TABLE 1

|  | Initial Transmittance ($\lambda$ = 500 nm) | Transmittance after Test ($\lambda$ = 500 nm) | Film Unevenness | Appearance after Test |
| --- | --- | --- | --- | --- |
| Comp. Ex. 1 | 82% | 73% | not observed | white burn observed |
| Ex. 1 | 82% | 82% | not observed | no white burn | environment durability test: 60° C. · 90% · 1,000 hours
spectro-transmittance: observed by means of a spectro-transmission meter available from JASCO Corporation.

EXAMPLE 2

Figure 4A:
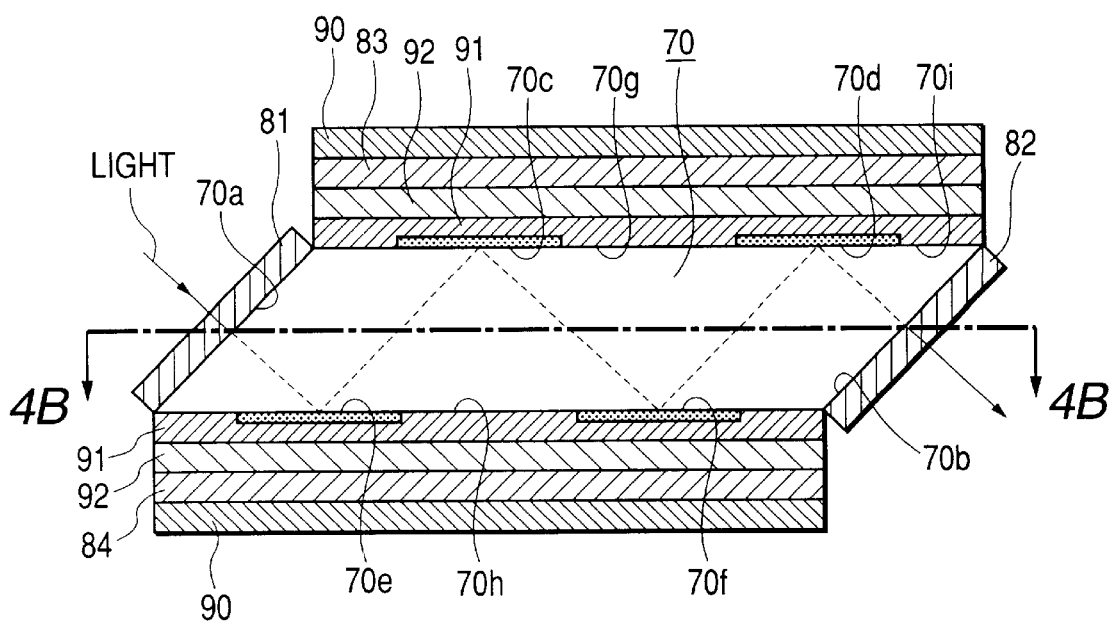
FIGS. 4A and 4B are schematic illustrations of a reflection type optical device obtained by modifying the first embodiment of the invention.
Figure 4B:
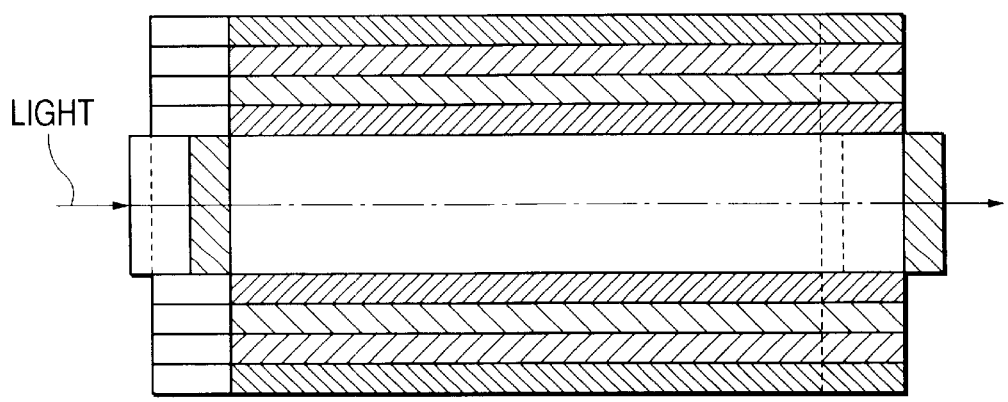

FIGS. 4A and 4B are schematic illustrations of a reflection type optical device (Example 2) obtained by modifying the first embodiment of the invention. FIG. 4A is a vertical cross sectional view and FIG. 4B is a horizontal cross sectional view. Referring to FIGS. 4A and 4B, dielectric layers 81, 82 were formed by means of an ion beam assisted evaporation technique respectively on the incident light receiving surface 70a and the light emitting surface 70b of a transparent base member 70 made of glass (LPHL-1: tradename, available from Ohara Inc.) and formed by cutting and polishing. As in Example 1, the dielectric layers 81, 82 had a multilayer structure prepared by sequentially forming films of $Al_2O_3/Ta_2O_5/Al_2O_3/Ta_2O_5/Al_2O_3/Ta_2O_5/MgF_2$ as viewed from the side of the glass base member. Then, a $TiO_2$ layer 91 (120 nm) and an $SiO_2$ layer 92 (120 nm) were formed by means of a Sol-Gel method, with masking the incident light receiving surface 70a and the light emitting surface 70b of the transparent base member 70.

The process of forming the $TiO_2$ layer 91 and the $SiO_2$ layer 92 will be described in detail below. The $TiO_2$ layer 91 was formed in a manner as described below. Firstly, a coating solution was prepared by dissolving 27 g of titanium tetraisopropoxide $Ti(O-iso-C_3H_7)_4$ (available from Kishida Chemicals, Inc.) in 200 g of ethanol, adding 4 g of water thereto and also adding 2 g of hydrochloric acid (35%). Then, the coating solution was applied to the entire surface of the transparent base member by a dipping coat technique and then dried and baked at 250° C. for 15 minutes.

The $SiO_2$ layer 92 was formed in a manner as described below. Firstly, a coating solution was prepared by dissolving 34 g of ethyl silicate $Si(O-C_3H_5)_4$ (available from Kishida Chemicals, Inc.) in 200 g of ethanol, adding 10 g of water thereto and also adding 1.2 g of hydrochloric acid (35%). Then, the coating solution was applied to the entire surface of the transparent base member by a dipping coat technique and then dried and baked at 250° C. for 15 minutes.

Then, silver films (metal films) 83, 84, 85, 86 were formed by vacuum evaporation respectively on all the outer surfaces 70c, 70d, 70e, 70f, 70g, 70h, 70i, 70j of the transparent base member 70. At this time, the vacuum evaporation process was so controlled as to make the silver films show a film thickness of 200 nm. As a result, a silver film was formed on all the surfaces of the transparent base member except the incident light receiving surface 70a and the light emitting surface 70b. Then, an acrylic resin layer 90 (200 nm) was formed on the silver films by applying acrylic resin (ALMATEX: tradename, dilute solution: available from Mitsui Chemicals, Inc.) by means of a dipping coat technique for the anti-rust purpose, with masking surfaces that do not need an anti-rust film. Thereafter, the applied acrylic resin was dried and baked at 100° C. for 30 minutes. Subsequently, the masking was removed.

Four vacuum evaporation processes were required to form a silver film on each of the top surface, the bottom surface and the two lateral surfaces, changing the direction of the transparent base member 40.

The reflection type optical device obtained in this example showed an initial transmittance of 83% for light with a wavelength of 500 nm. The produced silver films showed no film unevenness.

The optical device was left in an environment of 60° C. and 90% for 1,000 hours and subsequently the transmittance of the optical device was observed again to find that it was 83%, which was same as the initial value. Thus, the initial transmittance of 83% was maintained. No white burn was observed on the glass base member.

EXAMPLE 3

Dielectric films 81, 82, a $TiO_3$ layer 91 (120 nm) and an $SiO_2$ layer 92 (120 nm) were formed as in Example 2 and then silver films (metal films) 83 through 86 were formed by means of a silver mirror reaction. At this time, the silver mirror reaction was so controlled as to make the silver films show a film thickness of 200 nm.

The process of forming silver films by a silver mirror reaction was conducted in a manner as described below. After dissolving 60 g of silver nitrate in 1 L of pure water and stirring the solution, 28% aqueous solution of ammonia was dropped into the former solution until the latter turned brown and then turned transparent to obtain a silver-containing liquid. The dropped amount of the aqueous solution of ammonia was about 60 g. The transparent base member carrying the above described layers was then immersed in the silver-containing liquid and 10% aqueous solution of formaldehyde was dropped into the liquid, stirring the latter, in order to cause a silver mirror reaction to take place and deposit silver. As a result of forming silver film by means of a silver mirror reaction, silver was deposited on the entire surface of the transparent base member in this example. Then, acrylic resin was applied to the surface to produce an acrylic resin layer 90 for the anti-rust purpose.

The reflection type optical device obtained in this example showed an initial transmittance of 83% for light with a wavelength of 500 nm. The produced silver film showed a slightly uneven surface and the film thickness was also uneven to a certain extent. Additionally, the silver film showed uncoated areas due to the uneven film thickness so that it was not possible to produce a uniform film over the entire surface of the device. The optical device was left in an environment of 60° C. and 90% for 1,000 hours and subsequently the transmittance of the optical device was observed again to find that it had fallen to 80%. White burns were observed in the base member in areas located under the areas of the silver film that were not uniform.

The above fall of the transmittance (or reflectance) was caused as moisture penetrated into the transparent base member through the surface areas where the film was thin and those where the film was broken.

EXAMPLE 4

Dielectric films 81, 82 were formed respectively on the incident light receiving surface 70a and the light emitting surface 70b of a transparent base member 70 by means of the method used in Example 2 and then a $TiO_2$ layer 91 (120 nm) and an $SiO_2$ layer 92 (120 nm) were formed, masking the incident light receiving surface 70a and the light emitting surface 70b. Subsequently, silver films (metal films) 83 through 86 were formed as in Example 2 by electroless plating. At this time, the electroless plating was so controlled as to make the silver films show a film thickness of 200 nm, the electroless plating was conducted in a manner as described below.

The surfaces of the transparent base member carrying the above layers were treated in a corona discharge process and subsequently the base member was immersed in a 20 ml/L aqueous solution of a surfactant (Predip Neoganth B: tradename, available from Atotech Japan Co., Ltd.) for 1 minute and then in a 50 ml/L aqueous solution of an activator (Activator Neoganth 834 conc: tradename, available from Atotech Japan Co., Ltd.) at 35° C. for 5 minutes in order to apply palladium as catalyst. After the above treatment, the base member was washed with water for 2 minutes and immersed in a 5 ml/L aqueous solution of an reducing agent (Reducer Neoganth WA: tradename, available from Atotech Japan Co., Ltd.) for 5 minutes in order to reduce palladium ions. Then, the base member was washed with water once again for 2 minutes and immersed in an electroless plating bath having the composition shown in Table 2 for 10 minutes to deposit silver by electroless plating. A silver film was formed uniformly on the entire surface of the transparent base member 70 without changing the direction thereof in a single plating process because electroless plating was used to form the silver film.

TABLE 2

| silver nitrate | 6.8 g/L |
|---|---|
| covalt sulfate heptahydrate | 28 g/L |
| 28% aqueous ammonia | 121 g/L |
| ammonium sulfate | 99 g/L |
| pH | 10.0 |

Then, acrylic resin was applied to the surface to produce an acrylic resin layer 90 for the anti-rust purpose. Subsequently, the masking was removed.

The reflection type optical device obtained in this example showed an initial transmittance of 83% for light with a wavelength of 500 nm. The produced silver films showed no film unevenness.

The optical device was left in an environment of 60° C. and 90% for 1,000 hours and subsequently the transmittance of the optical device was observed again to find that it was 83%, which was same as the initial value. Thus, the initial transmittance of 83% was maintained. No white burn was observed on the glass base member.

The data obtained by observing the specimens of Examples 2 through 4 are summarized in Table 3 below.

TABLE 3

| | Silver Film Forming Method | Repetition of Film Formation | Film Thickness | Initial Transmittance ($\lambda$ = 500 nm) | Film Unevenness | Film Condition over Entire Surface | Transmittance after Test | Appearance after Test |
|---|---|---|---|---|---|---|---|---|
| Ex. 2 | vacuum evaporation | 4 | 200 nm | 83% | not found | apparently no defect | 83% | good |

TABLE 3-continued

| Silver Film Forming Method | Repetition of Film Formation | Film Thickness | Initial Transmittance (λ = 500 nm) | Film Unevenness | Film Condition over Entire Surface | Transmittance after Test | Appearance after Test |
|---|---|---|---|---|---|---|---|
| Ex. 3 | silver mirror reaction | 1 | 200 nm | 83% | found to some extent | uncoated area found due to film unevenness | 80% | white burn observed |
| Ex. 4 | electroless plating | 1 | 200 nm | 83% | not found | apparently no defect | 83% | good |

Figure 5A:
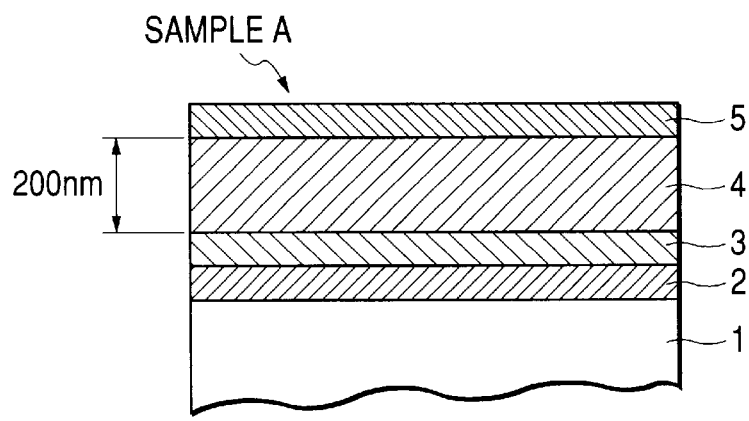
FIGS. 5A, 5B and 5C are schematic illustrations of the samples of reflection type optical device according to the invention obtained by differentiating the film thickness of the silver film thereof.
Figure 5B:
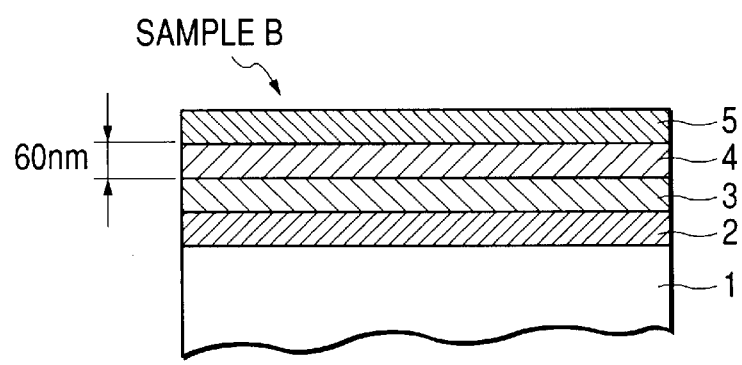
Figure 5C:
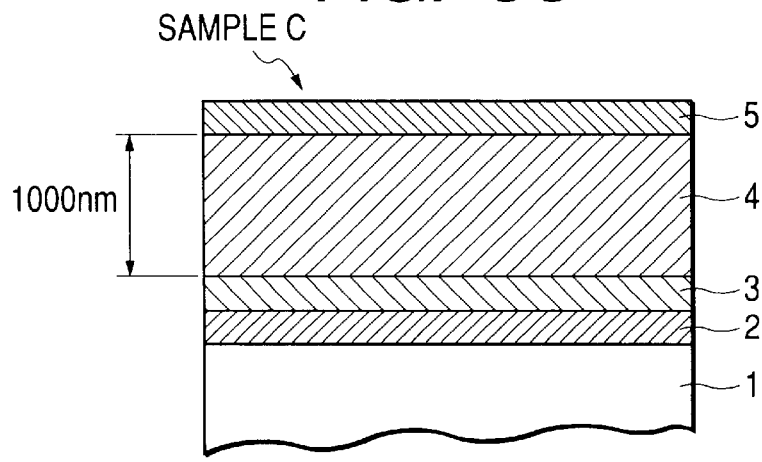

Then, Samples A, B and C as shown respectively in FIGS. 5A, 5B and 5C were prepared by modifying the thickness of the silver film obtained by electroless plating in Example 4 to 200 nm, 600 nm and 100 nm.

The electroless plating was conducted in a manner as described below. The surfaces of the transparent base member carrying the predetermined layers were treated in a corona discharge process and subsequently the base member was immersed in a 20 ml/L aqueous solution of a surfactant (Predip Neoganth B: tradename, available from Atotech Japan Co., Ltd.) for 1 minute and then in a 50 ml/L aqueous solution of an activator (Activator Neoganth 834 conc tradename, available from Atotech Japan Co., Ltd.) at 35° C. for 5 minutes in order to apply palladium as catalyst. After the above treatment, the base member was washed with water for 2 minutes and immersed in a 5 ml/L aqueous solution of an reducing agent (Reducer Neoganth WA tradename, available from Atotech Japan Co., Ltd.) for 5 minutes in order to reduce palladium ions. Then, the base member was washed with water once again for 2 minutes and immersed in an electroless plating bath having the composition shown in Table 2 for 10 minutes (Sample A), for 3 minutes (Sample B) and for 30 minutes (Sample C) to deposit silver by electroless plating. A silver film was formed uniformly on the entire surface of the transparent base member 70 of each of the Samples A, B, C. Then, acrylic resin was applied to the surface to produce an acrylic resin layer 90 for the anti-rust purpose. Subsequently, the masking was removed.

The Sample A carrying a 200 nm thick silver film showed an initial transmittance of 83% for light with a wavelength of 500 nm. The produced silver film showed no cracks. No white burn was observed in the transparent base member.

The Sample B carrying a 60 nm thick silver film showed an initial transmittance of 24% for light with a wavelength of 500 nm. It was not good as reflection type optical device because of an insufficient quantity of light. The produced silver film showed no cracks.

The Sample B was left in an environment of 60° C. and 90% for 1,000 hours and subsequently the transmittance of the optical device was observed again to find that it had fallen from the initial transmittance of 24% (500 nm) to 12%. The silver film had been lost in some areas and hence the formed silver film was not uniform. White burns were observed in the base member.

The above fall of the transmittance (or reflectance) was caused as moisture penetrated into the transparent base member through the surface areas where the film was lost to produce white burns in the transparent base member.

The Sample C carrying a 1,000 nm thick silver film showed an initial transmittance of 83% for light with a wavelength of 500 nm. Cracks were observed at the ends of the base member.

The Sample C was left in an environment of 60° C. and 90% for 1,000 hours and subsequently the transmittance of the optical device was observed again to find that it had fallen from the initial transmittance of 83% (500 nm) to 80%. The formed silver film was not uniform because of the cracks. White burns were observed in the base member in areas located under the cracks.

The above fall of the transmittance (or reflectance) was caused as moisture penetrated into the transparent base member through the cracks to give rise to white burns in the transparent base member.

The data obtained by observing the Samples A, B, C are summarized in Table 4 below.

TABLE 4

| | Initial Transmittance (λ = 500 nm) | Film Thickness | Film Condition over Entire Surface | Generation of Cracks | Transmittance after Test (λ = 500 nm) | Appearance after Test |
|---|---|---|---|---|---|---|
| Sample A | 82% | 200 nm | apparently no defect | no | 82% | good |
| Sample B | 24% | 60 nm | uncoated area found due to film unevenness | no | 12% | white burn observed |
| Sample C | 82% | 1000 nm | uncoated area found due to cracks | observed (particularly at end portions) | 80% | white burn observed | environment durability test: 60° C. · 90% · 1,000 hours
spectro-transmittance: observed by means of a spectro-transmission meter available from JASCO Corporation.

Figure 6:
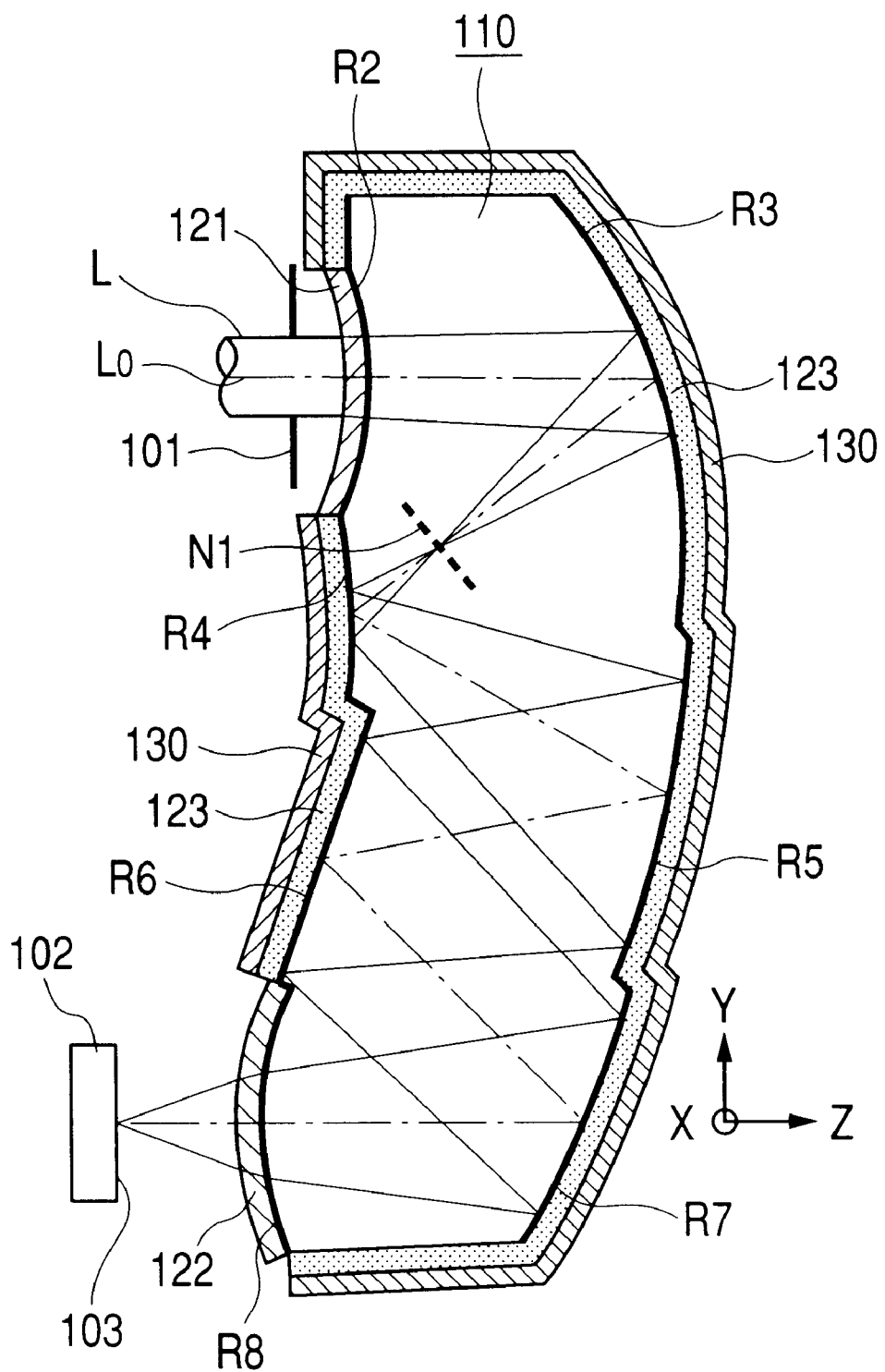
FIG. 6 is a schematic illustration of the second embodiment of reflection type optical device according to the invention.

FIG. 6 is a schematic illustration of the second embodiment of reflection type optical device according to the invention. In this embodiment of optical device, a plurality of curved reflection surfaces are formed integrally on a transparent base member 110. They are a concave refraction surface R2 operating as incident light receiving surface, five curved reflection surfaces including a concave mirror R3, a convex mirror R4, a concave mirror R5, a convex mirror R6 and a concave mirror R7 and a convex refraction surface R8 operating as light emitting surface that are arranged in the above order as viewed from the object side. The reference axis of incident light striking the optical device and that of exiting light emitted from the optical device are parallel to each other and directed oppositely.

Light L that strikes the incident light receiving surface R2 by way of a stop 101 proceeds through the transparent base member 110 of the reflection type optical device along optical axis $L_0$ and focussed on the light receiving surface 103 of the imaging device 102 that may typically be a CCD. The refraction surfaces R2, R8 operating respectively as incident light receiving surface and light emitting surface are spherical surfaces that are rotationally symmetrical and the reflection surfaces R3 through R7 operating as optical reflection-effective sections are anamorphic surfaces that are symmetrical relative to the YZ plane.

Now, the image forming effect of this embodiment will be described below. The quantity of the flux of light L entering the embodiment along the reference axis $L_0$ is restricted by the stop 101 before striking the concave refraction surface R2 of the optical device. The flux of light L entering the concave refraction surface R2 is diverged by the power of the concave refraction surface R2 and reflected by the concave reflection surface R3 while forming a primary image of the object by the power of the concave mirror on an intermediary image forming plane N1. As a result of forming an image of the object within the optical device in an early stage of operation, the increase in the effective beam diameter at the planes arranged closer to the image side than the stop 101 is suppressed.

After forming a primary image on the intermediary image forming plane N1, the flux of light L is repeatedly reflected by the convex mirror R4, the concave mirror R5, the convex mirror R6 and the concave mirror R7 and at the same time focused by the powers of the reflection mirrors before it forms an image of the object on the light receiving surface 103.

Thus, the optical device operates as a lens unit showing a desired optical performance and having a positive power as a whole, where incident light is refracted by the incident light receiving surface and the light emitting surface and reflected by the plurality of reflection mirrors until it gets to the light receiving surface 103.

In this embodiment, the reference axis of incident light striking the optical device and that of exiting light emitted from the optical device are parallel to each other and directed oppositely. Additionally, the reference axes of all the optical reflection-effective sections are found on the surface of FIG. 6 (YZ plane).

This embodiment is formed by molding press. The transparent base member 110 is made of glass for molding press and hence accompanied by the durability problem of becoming clouded in an environment showing high temperature and a high relative humidity to reduce the reflectance and the transmittance. In view of this problem, the refraction surfaces R2, R8 operating respectively as incident light receiving surface and light emitting surface are provided on the surfaces thereof with respective moisture resistant dielectric layers 121, 122. Additionally, the remaining outer surfaces other than the refraction surfaces R2, R8 of the transparent base member 110 are covered by metal film 123 that is a silver film.

The metal film 123 is adapted to reflect light by the rear surfaces thereof in the optical reflection-effective sections R3 through R7 and operate as anti-moisture film covering all the surfaces of the transparent base member 110 except the refraction surfaces R2, R8. This embodiment additionally comprises an acrylic resin layer 130 formed on the silver film (metal film) 123 for the anti-rust purpose.

As the entire surface of the transparent base member 110 is covered by the moisture-resistant dielectric layers 121, 122 and the silver film (metal film) 123, the low environment resistance of the transparent base member is satisfactorily made up for to realize a high performance reflection type optical device that is highly environment-resistant.

Otherwise, this embodiment is same as the first embodiment and hence will not be described any further. Now, the second embodiment of the invention will be described further by way of examples.

EXAMPLE 5

Transparent base members 110 showing a profile as shown in FIG. 6 were prepared respectively from phosphate type glass to be used for molding press (LPHL-1: tradename, available from Ohara Inc.), lanthanum type glass to be used for molding press (VC78: tradename, available from Sumita Optical Glass Inc.) and barium type glass to be used for molding press (LBAL35: tradename, available from Ohara Inc.) by molding press. Then, dielectric layers 121, 122 were formed respectively on the incident light receiving surface R2 and the light emitting surface R8 of each of the transparent base members 110 by vacuum evaporation and subsequently the incident light receiving surface R2 and the light emitting surface R8 were masked.

Then, a $TiO_2$ layer and an $SiO_2$ layer were formed to cover the entire surface of the transparent base member as in Example 2. Thereafter, a silver film (metal film) 123 was formed by electroless plating by means of a method same as the one used in Example 4. At this time, the process of forming the silver film was so controlled as to show a film thickness of 200 nm. Since a silver film was formed on the reflection type optical devices of the example by electroless plating, the silver film uniformly extended over the entire surface of the base member. Then, an acrylic resin layer 130 (200 nm) was formed on the silver film by applying acrylic resin (ALMATEX: tradename, dilute solution: available from Mitsui Chemicals, Inc.) by means of a dipping coat technique for the anti-rust purpose. Thereafter, the applied acrylic resin was dried and baked at 100° C. for 30 minutes. Subsequently, the masking was removed. As a result, the reflection, type optical devices of Example 5 were produced from the above glass materials.

COMPARATIVE EXAMPLE 2

As in Example 5, transparent base members 110 were prepared in this comparative example respectively from phosphate type glass to be used for molding press (LPHL-1: tradename, available from Ohara Inc.), lanthanum type glass to be used for molding press (VC78: tradename, available from Sumita Optical Glass Inc.) and barium type glass to be used for molding press (LBAL35: tradename, available from Ohara Inc.) by molding press. Then, dielectric layers 121, 122 were formed respectively on the incident light receiving surface R2 and the light emitting surface R8 of each of the transparent base members 110 by vacuum evaporation and subsequently the incident light receiving surface R2 and the light emitting surface R8 were masked.

Then, a $TiO_2$ layer and an $SiO_2$ layer were formed to cover the entire surface of the transparent base member as in Example 2. Thereafter, a silver film (metal film) 123 was formed only on the optical reflection-effective sections R3, R4, R5, R6, R7 by means of a vacuum evaporation method.

At this time, the vacuum evaporation process of forming the silver film was so controlled as to show a film thickness of 200 nm. Then, an acrylic resin layer (200 nm) was formed on the silver film by applying acrylic resin (ALMATEX: tradename, dilute solution: available from Mitsui Chemicals, Inc.) by means of a dipping coat technique for the anti-rust purpose. Thereafter, the applied acrylic resin was dried and baked at 100° C. for 30 minutes. Subsequently, the masking was removed. As a result, the reflection type optical devices of Comparative Example 2 were produced from the above glass materials.

The data obtained as a result of a high temperature/high humidity durability text conducted on the reflection type optical devices of Example 5 and Comparative Example 2 are summarized in Table 5 below.

TABLE 5

|  | Glass Material | Initial Transmittance ($\lambda$ = 500 nm) | Transmittance after Test ($\lambda$ = 500 nm) | Film Unevenness | Appearance after Test |
|---|---|---|---|---|---|
| Comp. Ex. 2 | LPHL-1 | 81% | 70% | not observed | white burn observed |
|  | VC78 | 81% | 68% | not observed | white burn observed |
|  | LBAL35 | 81% | 75% | not observed | white burn observed |
| Ex. 5 | LPHL-1 | 81% | 81% | not observed | good |
|  | VC78 | 81% | 81% | not observed | good |
|  | LBAL35 | 81% | 81% | not observed | good | environment durability test: 60° C. · 90% · 1,000 hours
spectro-transmittance: observed by means of a spectro-transmission meter available from JASCO Corporation.

The reflection type optical devices prepared from the above glass materials in Comparative Example 2 showed an initial transmittance of 81% for light with a wavelength of 500 nm. The produced silver film did not show any unevenness.

The optical devices were left in an environment of 60° C. and 90% for 1,000 hours and subsequently the transmittance of the optical devices was observed again to find that it had fallen to 81% (500 nm). White burns were observed on the base member.

The above fall of the transmittance (or reflectance) was caused as moisture penetrated into the transparent base member through the film ends to give rise to white burns on the base member.

The reflection type optical devices prepared from the above glass materials in Example 5 shoed an initial transmittance of 81% for light with a wavelength of 500 nm. The produced silver films showed no film unevenness.

The optical devices of Example 5 were left in an environment of 60° C. and 90% for 1,000 hours and subsequently the transmittance of the optical devices was observed again to find that it was 81%, which was same as the initial value. Thus, the initial transmittance of 81% was maintained. No white burn was observed on the glass base member.

As described above, with the first and second embodiments of reflection type optical device according to the invention and comprising a transparent base member, one or more than one moisture-resistant dielectric layers are formed on the incident light receiving surface and the light emitting surface and a metal film is or layers of a metal film and a dielectric layer are formed on the entire outer surface of the glass base member except the incident light receiving surface and the light emitting surface to fend off moisture. As a result, the embodiments of reflection type optical device according to the invention are highly durable without lowering both the transmittance and the reflectance if they are left in a high temperature/high humidity environment.

Additionally, the film forming process according to the invention is simple if compared with the prior art of forming metal film only on the optical reflection-effective sections by vacuum evaporation. More specifically, it is possible to realize a high performance reflection type optical device having a complex profile including a number of minute or irregular surfaces by using a wet film forming process such as electroless plating. Thus, according to the invention, a high quality reflection optical device can be obtained at low cost particularly in terms of film forming process.

As described above, the environment resistance and the durability of a reflection type optical device according to the invention can be improved by covering the entire surface of the transparent base member with a moisture-resistant dielectric layer and metal film. Additionally, the process of forming metal film on the entire surface of the transparent base member by electroless plating comprises only a single step and hence is very simple if compared with a process of selectively forming metal film on a plurality of optical reflection-effective sections of the device so that the cost of manufacturing a reflection type optical device can be greatly reduced.

What is claimed is:

1. A reflection type optical device comprising:
   a transparent base member having an incident light receiving surface, at least an optical reflection-effective section for internally reflecting the incident light, a light emitting surface for emitting the reflected light and an optically non-effective section;
   a first dielectric layer formed on said incident light receiving surface and said light emitting surface of said transparent base member; and
   a metal layer formed on said optical reflection-effective section and said optically non-effective section of said transparent base member but not on said incident light receiving surface and said light emitting surface.

2. A device according to claim 1, wherein said metal layer comprises a silver layer.

3. A device according to claim 1, wherein said metal layer has a film thickness between 100 and 1,000 nm and shows a reflectance between 80 and 99.5% relative to light with a wavelength range between 350 and 900 nm.

4. A device according to claim 1, further comprising: a second dielectric layer formed between the surface of said transparent base member and said metal layer.

5. A device according to claim 4, wherein said second dielectric layer comprises a reflection boosting film having a low refractive index layer and a high refractive index layer.

6. A device according to claim 1, further comprising: a protection layer formed on said metal layer for the anti-rust purpose.

7. A device according to claim 1, wherein said first dielectric layer is a dielectric multilayer film having a structural configuration of $Al_2O_3/Ta_2O_5/Al_2O_3/Ta_2O_5/Al_2O_3/Ta_2O_5/MgF_2$ as viewed from the side of the transparent base member.

8. A device according to claim 1, wherein said transparent base member comprises a glass base member.

9. A device according to claim 8, wherein said glass base member contains at least a compound selected from a group of $P_2O_5$, $La_2O_5$ and BaO.

10. A method of manufacturing a reflection type optical device comprising steps of:

preparing a transparent base member having an incident light receiving surface, at least an optical reflection-effective section for internally reflecting the incident light, a light emitting surface for emitting the reflected light and an optically non-effective section;

forming a first dielectric layer on the incident light receiving surface and the light emitting surface of the transparent base member; and forming a metal layer formed on said optical reflection-effective section and said optically non-effective section of the transparent base member but not on the incident light receiving surface and the light emitting surface.

11. A method according to claim 10, wherein said metal layer comprises a silver layer.

12. A method according to claim 10, wherein said step of forming the first dielectric layer comprises a step of forming the first dielectric layer by means of a wet film forming process.

13. A method according to claim 10, wherein said step of forming the first dielectric layer comprises a step of forming the first dielectric layer by means of an electroless plating process.

14. A method according to claim 10, wherein said metal layer is formed to have a film thickness between 100 and 1,000 nm and said metal layer shows a reflectance between 80 and 99.5% relative to light with a wavelength range between 350 and 900 nm.

15. A method according to claim 10, further comprising:

a step of forming a second dielectric layer between the surface of said transparent base member and said metal layer.

16. A method of manufacturing a reflection type optical device according to claim 15, wherein said step of forming a second dielectric layer comprises a step of forming a low refractive index layer and a high refractive index layer on said transparent base member.

17. A method according to claim 10, further comprising:

a step of forming a protection layer on said metal layer for the anti-rust purpose.

18. A method according to claim 10, wherein said step of forming a first dielectric layer comprises a step of forming a dielectric multilayer film having a structural configuration of $Al_2O_3/Ta_2O_5/Al_2O_3/Ta_2O_5/Al_2O_3/Ta_2O_5/MgF_2$ as viewed from the side of the transparent base member.

19. A method according to claim 10, wherein said step of preparing said transparent base member comprises step of forming a glass base member by molding press.

20. A method according to claim 19, wherein said glass base member contains at least a compound selected from a group of $P_2O_5$, $La_2O_5$ and BaO.

* * * * *

UNITED STATES PATENT AND TRADEMARK OFFICE
CERTIFICATE OF CORRECTION

PATENT NO. : 6,511,190 B2
DATED : January 28, 2003
INVENTOR(S) : Masanobu Ohgane It is certified that error appears in the above-identified patent and that said Letters Patent is hereby corrected as shown below:

Column 1,
Line 41, "an" should be deleted.

Column 4,
Line 57, "below." should read -- below: --; and
Line 59, "nm" should read -- nm. --.

Column 7,
Line 12, "lob" should read -- 10b --.

Column 10,
Line 21, "an" should read -- a --.

Column 11,
Line 29, "conc" should read -- conc: --; and
Line 34, "an" should read -- a --; and "WA" should read -- WA: --.

Column 14,
Line 45, "reflection," should read -- reflection --.

Column 15,
Line 65, "is" should be deleted.

Signed and Sealed this

Twenty-eighth Day of October, 2003

JAMES E. ROGAN
*Director of the United States Patent and Trademark Office*